Nov. 6, 1951 J. M. LANDRY 2,574,113
AGRICULTURAL IMPLEMENT AND SUPPORT FOR THE SAME
Filed May 26, 1947 3 Sheets-Sheet 1

INVENTOR.
JACOBUS M. LANDRY
BY
George B White
ATTORNEY

Nov. 6, 1951   J. M. LANDRY   2,574,113
AGRICULTURAL IMPLEMENT AND SUPPORT FOR THE SAME
Filed May 26, 1947   3 Sheets-Sheet 2
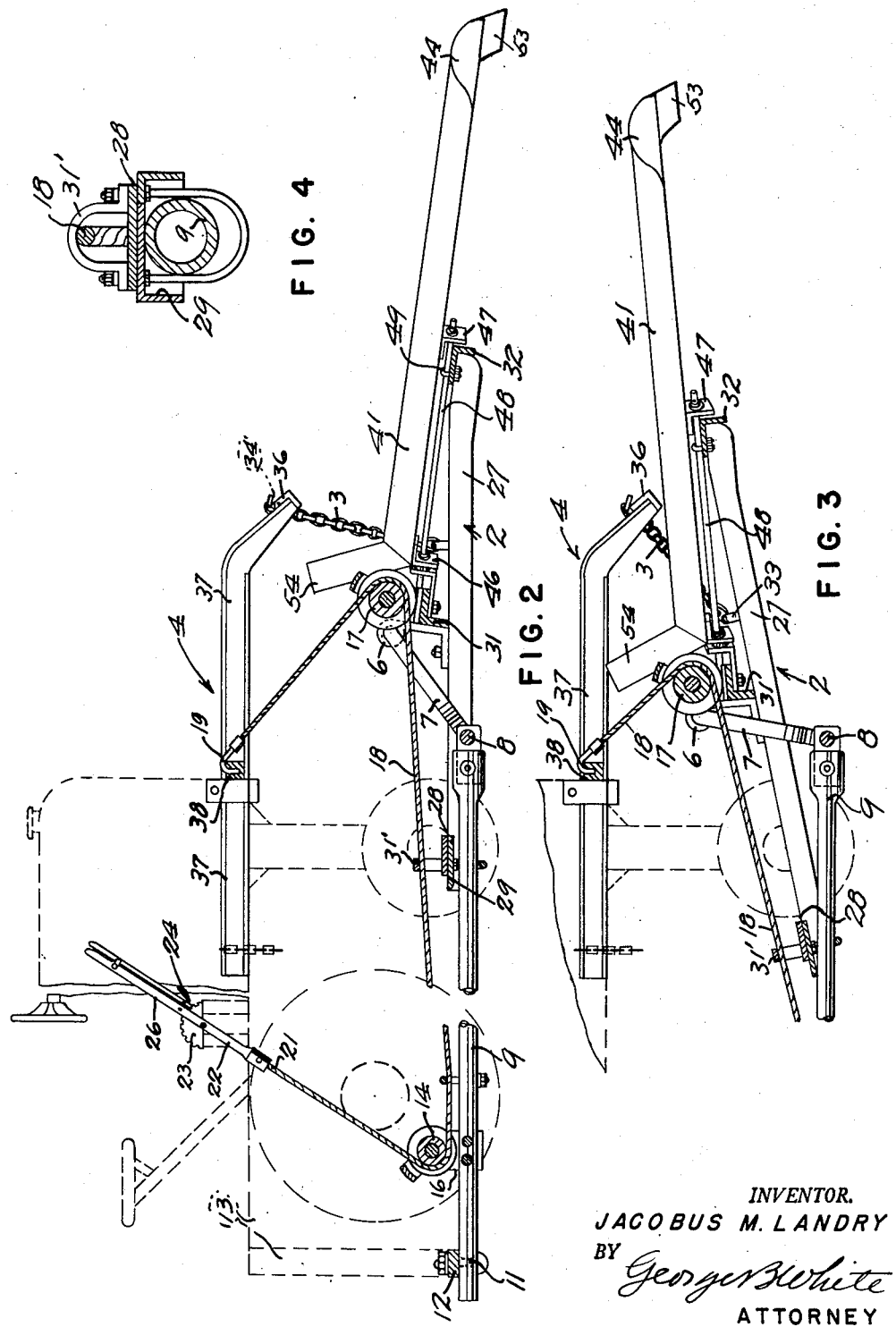
INVENTOR.
JACOBUS M. LANDRY
BY
ATTORNEY Nov. 6, 1951 J. M. LANDRY 2,574,113
AGRICULTURAL IMPLEMENT AND SUPPORT FOR THE SAME
Filed May 26, 1947 3 Sheets-Sheet 3

INVENTOR.
JACOBUS M. LANDRY
BY
ATTORNEY

Patented Nov. 6, 1951

2,574,113

UNITED STATES PATENT OFFICE 2,574,113

AGRICULTURAL IMPLEMENT AND SUPPORT FOR THE SAME

Jacobus M. Landry, Summerland, British Columbia, Canada

Application May 26, 1947, Serial No. 750,451

17 Claims. (Cl. 56—27)

This invention relates to an agricultural implement and suspending device for the same.

An object of this invention is to provide an agricultural implement with a supporting device whereby it can be easily attached to a vehicle such as a tractor or the like and pushed thereby along the ground, the elements of said attaching or supporting device being so correlated as to respond to increased reaction force or resistance and to hold the implement in an equilibrium under various loads or resistance and to prevent the implement to dig too deeply into the ground.

Another object of the invention is to provide an agricultural implement in the form of a rake which can be pushed in front of a vehicle such as a tractor or other prime mover, and which is particularly adapted for use in orchards, grooves, vineyards and the like for picking up and carrying for disposal prunings and the like from the ground.

Another object of this invention is to provide a rake of the brush rake type in which the tines are individually adjustable when pushed along the ground so as to conform to the contour of the ground raked.

Another object of this invention is to provide a rake adapted to be pushed in front of a tractor or the like vehicle, and to provide a control mechanism whereby the driver of the vehicle can easily raise or lower the entire unit.

Another object of the invention is to provide a novel supporting structure for a rake or other agricultural implement which at all times prevents the penetration of the rake or the implement too deeply into the ground, and which is responsive to the weight exerted upon the rake as well as resistance encountered by the same, to raise by the action of such resistance or weight the implement to a point above the ground where a certain equilibrium or balanced state is reached in which the implement is most easily operable.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 2 is a side elevation of the rake showing the same in operative position.

Fig. 3 is a side elevation of the rake showing the same in uplifted position.

Fig. 4 is a cross section taken along the line 4—4 of the Fig. 1.

Figure 1:
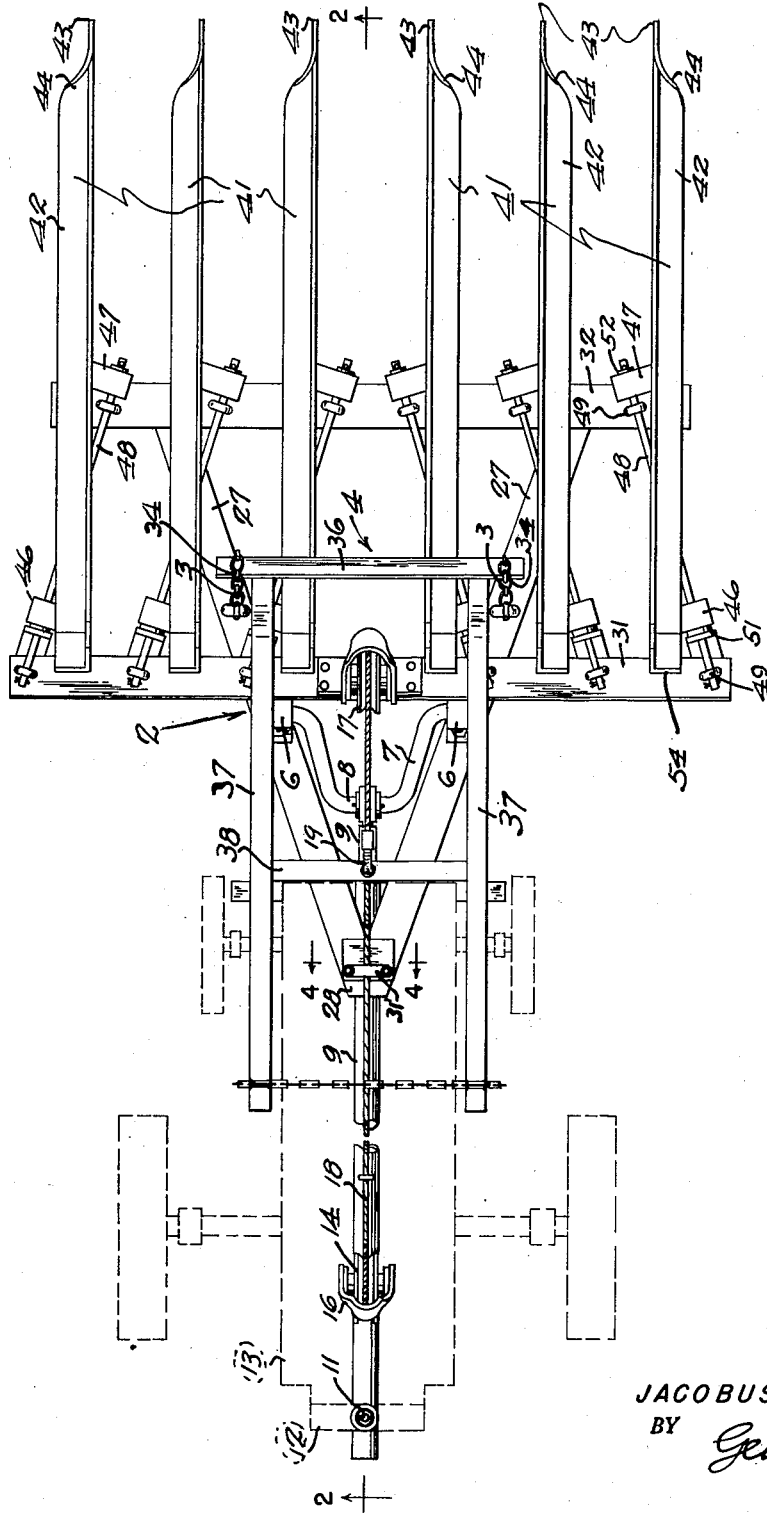
Fig. 1 is a plan view of the rake constructed in accordance with the teachings of the invention.

In the herein illustrative embodiment the invention is shown in the form of an implement particularly adapted for raking. Usually prunings, branches, and twigs to be raked in orchards or the like lie scattered over irregular and furrowed ground. The first step therefore in the operation of the device should consist in raking up of such scattered material, which then collects over and in front of the points of the tines of the rake. It is one of the features of my invention that during the raking operation each independent tine is individually self-adjustable. Independent individual tine mountings are provided to hold the tines generally inclined toward the ground. The points of the tines have a substantially perpendicular forepart or edge adapted to penetrate into the ground. The tines also have a flat bottom portion into which the penetrating edge tapers in such a way that the flat portion of the tines resists penetration beyond a certain depth and follows the contour of the ground surface so as to raise the tines whenever they encounter higher ground.

Another feature of my invention is that after an accumulation of brush at the point of the tines a forking action takes the place of the aforesaid raking action. The accumulated brush then acts in sweeping the scattered material. As the brush is swept upon the rake and as there is an increasing accumulation of brush thereon exerting a downward force upon the rake, such weight has a tendency to further press the tines into the ground. The brush is swept onto the rake by the brush accumulated on the ground both between the tines and ahead of the tines. The brush on the ground offers resistance to forward motion. The resistance acts partly to push the brush from the ground onto the rake and it also tends to stop the rake. This results in greater resistance or reaction to the forward motion of the rake. Such increased bearing on the ground is proportionate to the weight of the brush on the tines. The resistance is proportionate to this bearing on the ground. The resistance to such forward motion acts to adjust the entire rake and implement to support it in such a manner above the ground as to reduce the resistance to forward motion to a certain balance or optimum operating condtion. It is a feature of my invention that the effect of the increased weight of the brush on the tines of the rake and the increased resistance is compensated for by a shifting of the position of the support in such a manner as to prevent the forcing of the tines too deep into the ground and allow a forking operation by the rake, namely the simultaneous carrying of the brush already on the rake and the pushing of the brush accumulated on the ground ahead of the rake.

In carrying out my invention I make use of a frame 2 which is carried in front of a tractor or the like and is flexibly suspended by chains 3 which chains extend downwardly and rearwardly from a supporting tractor attachment frame 4. Behind the chain support on the frame 2 are provided spaced bearing brackets 6 into which are journalled the ends of a yoke 7, the middle 8 of which in turn is journalled in a shaft 9 downwardly and inwardly from said yoke end. The shaft 9 in turn extends under the vehicle or tractor and is secured by the usual draw bolt 11 into a draw bar 12, supported on the rear portion 13 of the vehicle frame, indicated in broken lines. The suspension of the frame 2 on the chains 3, the pivot yoke 7 and the shaft 9 is a balanced relationship. The weight of the implements supported on the frame 2 are so selected that the general tendency is for the frame to move forward to the ground. The horizontal component of the reaction force during the forking phase of the operation urges the frame 2 rearwardly so as to swing the chains 3 rearwardly, which results in a turning of the yoke 7 upwardly around the end of the shaft 9 as a fulcrum, thereby lifting the frame 2 sufficiently to balance the load on the implement and on the frame. The arrangement of the relative angles of these supporting and suspending elements are such that the shaft 9 is held in generally horizontal position.

For the general adjustment of the entire frame and implement into and out of operative position, a pulley 14 is supported on a bracket 16 on the shaft 9 beneath the position of the driver. Another pulley 17 is supported on a bracket above the frame 2 substantially between the position of the chains 3 and the yoke journal 6. A line, such as a cable 18, is extended around the pulleys 14 and 17. The end of the line 18 which extends around the pulley 17 is turned rearwardly and upwardly and is hooked by a hook 19 onto the front end of the tractor. The rear end 21 of the cable 18 is played around the pulley 14 and it is connected to the end of a hand lever 22 pivoted on a bracket 23 in the driver's compartment. A suitable releasable ratchet arrangement 24 on the handle 26 of said lever 22 provided for the fastening of the cable 18 in various adjusted positions. In order to lower the frame the handle is in the position shown in Fig. 2. By pulling the handle 26 back, the cable is pulled around the pulley 14 and it lifts the frame upwardly to an out of the way position, substantially as illustrated in Fig. 3.

In detail the frame 2 has a pair of converging sides 27, which form an apex 28 at one end of the frame. On the underside of the apex 28 is formed a suitable saddle 29 which is slidable on the shaft 9 during relative adjustments of the frame 2. On the top of the saddle 29 is provided a guide loop 31' through which the cable 18 extends and is held in position.

Across the converging frame sides 27 are provided a pair of crossbars 31 and 32. These crossbars are substantially parallel. The rear crossbar 31 extends across about the middle of the frame 2. The front crossbar 32 extends across the free ends of the frame sides 27. The yoke brackets 6 extend upwardly from the frame sides 27 adjacent the rear crossbar 31. The loops 33 for the chain connections are spaced forward from the apex of the frame, but rearward from the center of gravity of the unit so that the chains extend upwardly and forwardly with respect to the frame.

The points of support for the frame 2 are at the loops 33 from the upwardly and forwardly inclined chains 3, the journal brackets 6 for the yoke, and the slidable support at the saddle 29 at the apex of the frame. This frame by reason of its convergence to the apex can be located beneath the tractor frame without interfering with the steering or a certain degree of side movement of the tractor.

The suspending chains 3 are engaged in notches 34 at the ends of a bar 36, which is across longitudinal bars 37 forwardly extended from the tractor. These bars may be part of the tractor or they may be part of the attachment for various sizes of tractors. Another crossbar 38 extends between the longitudinal bars 37 adjacent the front end of the tractor, and the hook 19 of the cable hooks in a hole in said crossbar 38. It is to be noted that the longitudinal members 37 extend beyond the front end of the tractor so that the main portion of the frame 2 and the implements thereon are supported ahead of the tractor or the like vehicle as they are pushed along the ground thereby.

The frame 2 is so made in connection with the rake structure supported thereon that the tines 41 are supported longitudinally with respect to the axis of the frame 2 and are inclined from the rear crossbar 31 toward the front or forward crossbar 32. This is accomplished by supporting the rear crossbar 31 on a higher level with respect to the top of the frame 2 than the level of the forward crossbar 32.

Each tine is made with a flat base 42 which in the present illustration is formed by one side of an angle iron from which the tine 41 is made. The tine 41 terminates in a point with a vertical penetrating edge 43. From this edge 43 a rounded portion or side flange 44 is curved and slants down into the base 42 at a point spaced from the forward penetrating edge 43 in such a manner that increased resistance or penetration into the ground bears against this curved flange 44 as well as against the base 42 thereby lifting the tine 41 from the ground. In this manner the penetration of the tine into the ground is prevented.

By reason of the individual journal support of the tines on the frame 2 the aforementioned self-adjustment of the tines can be individually accomplished by each tine without lifting the other tines or the frame. This is accomplished by providing a pivotal support wherein the pivot axis is oblique with respect to the longitudinal axis of the tine which it supports, and in which the pivot axis also extends downwardly and forwardly with respect to the frame 2 as shown in Fig. 2. In the illustrative embodiment herein described this is accomplished by extending from the opposite sides of each tine a pair of bearing brackets 46 and 47. The bearing bracket 46 closer to the rear end of the tine extends not at right angles from the tines, but at right angles to the desired oblique pivot axis. The bearing bracket 47 is spaced from the bearing bracket 46 so that it is approximately above the front crossbar 32, and extends on the opposite side of the tine 11 also at an oblique angle with respect to the tine. The bearings in the bearing brackets 46 and 47 are aligned axially on the desired oblique pivot axis. These bearing brackets 46 and 47 are journalled on a pivot shaft 48 supported in suitable lugs 49 respectively on the crossbars 31 and 32. The rear bearing bracket 46 on the tine 41 abuts against an ear 51 extended from the rear crossbar 31 so as to hold the tine in the spaced position. A suitable washer or collar 52 on the forward end of the pivot shaft 48 further determines the position of the tine 41.

A downward and forward projection 53 extends from the penetrating edge 43 and from the lower edge of the point of the tine as particularly shown in Figs. 2 and 3. This point is a penetrating and spacing projection to guide the tine above the ground.

Figure 5:
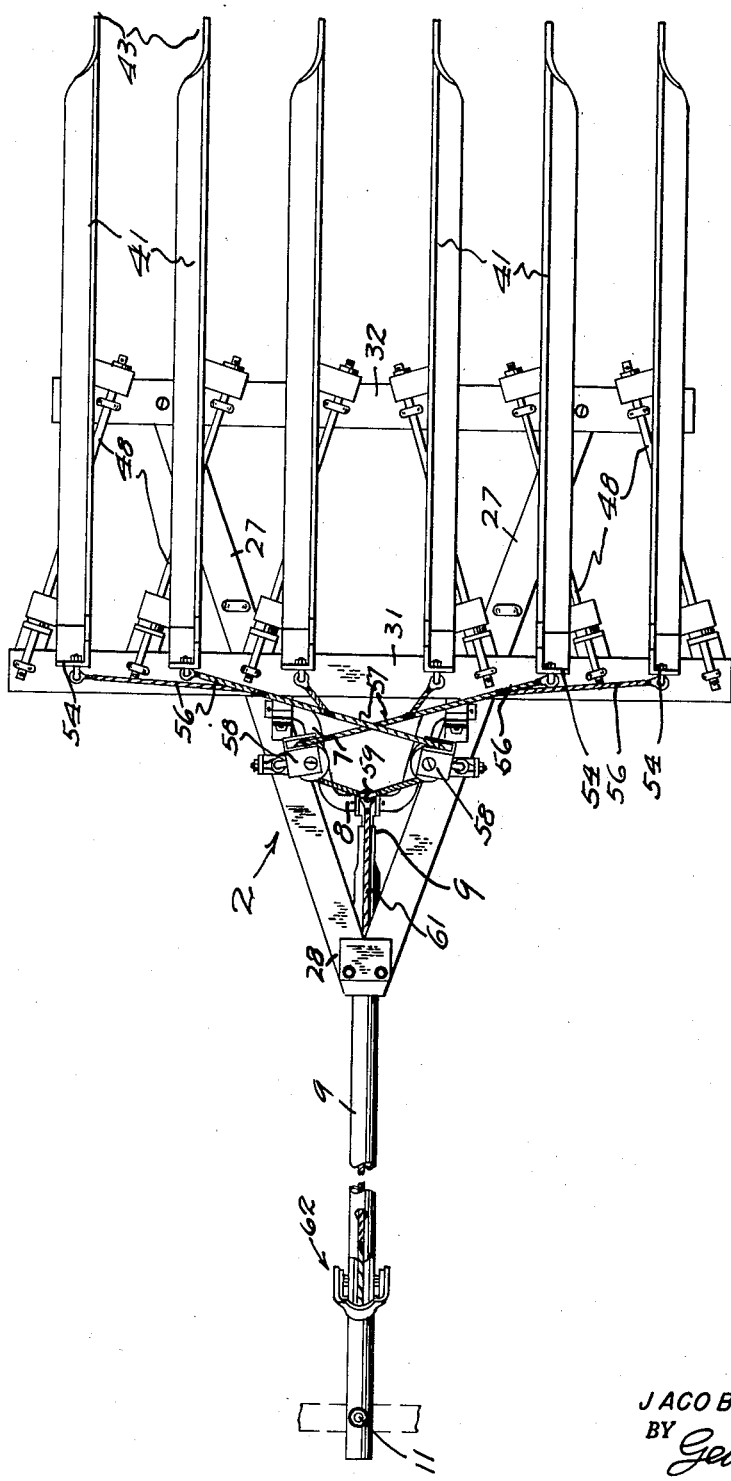
Fig. 5 is a plan view of a modified form of the rake.

The tines have an arm 54 extended from the rear ends thereof at an angle as shown particularly in Figs. 2 and 3. This arm may be utilized for the purpose of lifting the entire device by the tines instead of the cable arrangement heretofore described. As shown in Fig. 5 to each of the tine arms 54 is attached by suitable pivot loops a cable 56. These cables 56 are spliced together so that they form ultimately two pull lines 57. It is to be noted that the oblique pivots on one side of the center line of the implement are parallel with one another but converge toward the oblique pivots of the tines on the other half of the frame. This balances the forces and the action on the opposite sides of the frame. This also necessitates the two pull lines 57 in this structure. Each of these lines 57 is played around a pulley block 58 suitably pivoted on the opposite side members of the frame 2. It is to be noted that the lines 57 cross over and then around the pulleys of the blocks 58 and are united in a loop 59 adjacent the middle of the yoke heretofore described. The shaft 9 is tubular, and a single pull line 61 extended from the loop joint 59 is slidable through the tubular shaft and passes out through a pulley structure 62 on the tubular shaft, so as to be connected to the hand lever 22 and operate in the manner heretofore described. The manner of operation for lifting and lowering the unit in this modified construction involves the pulling of all the tines upwardly and thereby raising the frame 2 therewith into the adjusted position.

In operation, as the frame 2 is lowered into operative position, the rake tines 41 by gravity drop downwardly and forward to the ground. As the rake is moved forward the weight of the tines will cause the point 53 to penetrate into the ground, but the curved flange 44 and the base of the angle iron tines will maintain the tines above the ground. Whenever the tines encounter undue resistance or a higher irregular surface this point flange 44 and the base ride up on that surface and swing the individual tine 41 around its oblique pivot axis. By reason of the rear pivot being higher than the lower pivot bracket the tine will always fall back to its position to the ground. In this manner in the initial operation of raking the tines will individually assume attitudes following substantially the contour of the ground. As brush piles upon the rake and in the front of the rake the forking takes place and the brush is partly carried and partly pushed. In proportion with this increased load there is a tendency to push the rake with greater force into the ground. The reaction force of the ground exerted upon the point flange 44 and the base of the tine will partly counteract this increased load. The horizontal component of the increased load will also counteract said vertical tendency. This action results in a slight self-adjustment by pushing the frame 2 rearwardly swinging the chains 3, which motion causes the pivoting of the yoke 7 around the middle 8 upwardly thereby lifting the frame 2 and the rake tines 41 thereon to the position wherein the increased resistance by reason of said increased load of the brush on the rake is substantially counterbalanced, so that the operation can proceed with about the same smoothness. Due to the rearward and downward incline of the chain support 3 and the forward and upward inclination of the yoke 7 from its middle 8 there is a continuous tendency to swing the frame and the rake forward by gravity. The increase of the load or resistance to motion counteracts this tendency and pushes the whole unit rearward and backward around the chain pivot and the yoke pivot 8, allowing the rear end or saddle of the frame to slide on the top of the shaft 9. This self-adjustment prevents undue penetration of the rake into the ground and obviates interruption of work by such failure. As the weight or load or resistance increases on the unit it is shifted backwardly and upwardly into a balanced position for continued operation. As the resistance or the load is reduced it automatically shifts forward again to the initial position.

The device herein described offers a novel support for implements, wherein forward push is transmitted through the chains and by the gravity and weight of the implement. Lateral movement of the rake is restricted but not completely prevented because the converging arrangement and apex provides a clearance for slight lateral movement between the wheels of a tractor or the like. This facilitates the steering of the tractor. The device provides a separately and quickly attachable frame to support an implement such as a rake, at the front end of a vehicle. It permits the manufacture of a single type of rake fitting all types of tractors, only slightly varying the members of the attachment frame from which the chain is suspended. The tines are individually self adjustable according to the resistance they encounter during the raking operation. After the brush loads on the tines, they do not operate individually but together as a unit. The higher the load upon the rake thereafter the more resistance there is to the forward movement. This resistance compensates for the increased load by forcing the entire unit back upon the chains and around its yoke pivot so as to lift the entire frame and tines slightly above the ground until the resistance is reduced to the desired balanced position. The entire rake and unit finds a point of equilibrium always close to the ground. The penetration of the tine points is dependent upon the resistance. The angle to the ground varies according to the position on the chain suspension. Altogether the entire unit adjusts itself according to the weight or load carried or pushed by it and furnishes a sweeping operation for raking and also forking action for collecting and carrying the brush upon the rake in a balanced and easy manner, and without interruption of operation for freeing parts of the implements from the ground.

I claim:

1. A pusher rake attachment for vehicles, comprising a frame, a swingable suspension device to suspend said frame from a vehicle and normally urge the rake forwardly, a plurality of tines, pivotal means to mount each tine on the frame, and means separate from said suspension device to lift or lower said tines and frame together.

2. A pusher rake attachment for vehicles, comprising a frame, a suspension device to suspend said frame from a vehicle being swingable rearwardly by the forces exerted upon the rake when pushed, a plurality of tines, journal means on the frame for each of said tines being offset toward the suspension device with respect to the center of gravity of the tine to permit the dropping of the point of the tine toward the ground.

3. A pusher rake attachment for vehicles, comprising a frame, a freely swingable suspension device to suspend said frame from a vehicle and to react to forces exerted upon the rake when pushed, a plurality of tines, journal means on the frame for each of said tines being offset toward the suspension device with respect to the center of gravity of the tine to permit the dropping of the point of the tine toward the ground and normally to urge the frame and tines forwardly, a ground penetrating edge formed on the point of each tine, and an inclined surface at said point to limit the penetration of the point into the ground and to react to turn said tine and to swing said frame on said suspension device rearwardly and upwardly when said limit of penetration is exceeded.

4. A raking device of the character described, comprising a frame, a plurality of tines journalled on the frame, a penetrating point on each tine, an inclined surface at said point formed at an angle to exert a lifting turning moment on the tine around the tine journal and ride on the ground when the rake is pushed over the ground, and a freely swinging suspension device for suspending the frame from a vehicle, and a fulcrumed element separate from said suspension device pivoting said frame and being adapted to be fulcrumed on a towing part of said vehicle.

5. A raking device of the character described, comprising a frame, a plurality of tines journalled on the frame, a penetrating point on each tine, an inclined surface at said point to exert a lifting turning moment on the tine around the tine journal when the rake is pushed over the ground, a suspension device being freely swingable on the vehicle to normally swing said frame and tines forwardly and being adapted to be pushed back under the effect of increased resistance to forward motion of said rakes and thus to raise said frame, a fulcrumed element extended downwardly from the frame and adapted to be fulcrumed on a towing element of the vehicle, and a mechanism for raising and lowering said frame and tines about said fulcrumed element.

6. In a raking device of the character described a frame, a plurality of tines arranged longitudinally on the frame, an individual journal on the frame for each tine, a penetrating edge on the point of each tine in a plane substantially perpendicular with respect to the longitudinal axis of the tine, a curved surface formed near the point of each tine being generally inclined with respect to a horizontal plane in a direction opposite to the inclination of the tine to exert a lifting moment on the tine when penetration is too deep, a freely swingable suspension mechanism for suspending said frame and tines from a vehicle, and a fulcrum support on the vehicle fulcrumed on the frame to said frame and coacting with said suspension mechanism to raise and lower said frame according to the reaction force on said points of said tines.

7. In a raking device of the character described a frame, a plurality of tines arranged longitudinally on the frame, an individual journal on the frame for each tine, a penetrating edge on the point of each tine in a plane substantially perpendicular with respect to the longitudinal axis of the tine, a curved surface formed near the point of each tine being generally inclined with respect to a horizontal plane in a direction opposite to the inclination of the tine to exert a lifting moment on the tine when penetration is too deep, said frame converging to an apex beyond the journals and being adapted to extend under a vehicle, a relatively stationary guiding member slidably engaged with said apex, a fulcrum yoke pivoted on said member and to said frame to journal said frame above said member and around a pivot axis transverse with respect to said frame and shaft, and freely swingable suspension means suspended from said vehicle above said fulcrum yoke and connected to said frame to suspend said frame and tines.

8. In a raking device of the character described a frame, a plurality of tines arranged longitudinally on the frame, an individual journal on the frame for each tine, a penetrating edge on the point of each tine in a plane substantially perpendicular with respect to the longitudinal axis of the tine, a curved surface formed near the point of each tine being generally inclined with respect to a horizontal plane in a direction opposite to the inclination of the tine to exert a lifting moment on the tine when penetration is too deep, said frame converging to an apex beyond the journals and being adapted to extend under a vehicle, a relatively stationary guide member slidably engaged with said apex, transverse journal yoke on said frame located between said apex and the tine journals being fulcrumed on said guide member, and suspension elements connected to said frame and adapted to be suspended from said vehicle above said yoke.

9. In a raking device of the character described a frame, a plurality of tines arranged longitudinally on the frame, an individual journal on the frame for each tine, a penetrating edge on the point of each tine in a plane substantially perpendicular with respect to the longitudinal axis of the tine, a curved surface formed near the point of each tine being generally inclined with respect to a horizontal plane in a direction opposite to the inclination of the tine to exert a lifting moment on the tine when penetration is too deep, said frame converging to an apex beyond the journals and being adapted to extend under a vehicle, a relatively stationary guide member slidably engaged with said apex, journal yoke on said frame and extended downwardly and rearwardly to and fulcrumed on said member to journal said frame around a pivot axis transverse with respect to said frame, swingable suspension means above said yoke to suspend said frame on a vehicle, a mechanism for lifting and lowering said frame and tines at will, said journal yoke and said suspension means being spaced rearwardly from the center of gravity of said device and said journal yoke extending upwardly with respect to said member to guide said frame and tines upwardly under the effect of increased resistance to forward motion of said tines.

10. In a pusher rake of the character described, a frame, freely swingable means to suspend the frame on a vehicle in a position to be pushed by said vehicle, a plurality of parallel tines longitudinally arranged on the frame, a journal structure on the frame for each tine including a pair of coacting journal elements on opposite sides of the tine and on the frame being spaced longitudinally with respect of the tine, and being aligned on a pivot axis oblique with respect to the longitudinal axis of the tine.

11. In a pusher rake of the character described, a frame, freely swingable means to suspend the frame on a vehicle in a position to be pushed by said vehicle, a plurality of parallel tines longitudinally arranged on the frame, and a journal structure on the frame for each tine including a pair of coacting journal elements on opposite sides of the tine and on the frame being spaced longitudinally with respect of the tine, and being aligned on a pivot axis oblique with respect to the longitudinal axis of the tine, and a penetrating point on each tine formed in a substantially vertical plane to convert the ground reaction to penetrating force into generally transverse turning of the tine about said oblique pivot axis.

12. In a pusher rake of the character described, a frame, means to suspend the frame on a vehicle in a position to be pushed by said vehicle, a plurality of parallel tines longitudinally arranged on the frame, and a journal structure on the frame for each tine including a pair of coacting journal elements on opposite sides of the tine and on the frame being spaced longitudinally with respect of the tine, and being aligned on a pivot axis oblique with respect to the longitudinal axis of the tine, said frame suspending means including a relatively stationary element adapted to be attached to a vehicle, a swinging fulcrum yoke extended downwardly from said frame and fulcrumed on said stationary element around an axis transverse to the frame, and swingable suspension elements between said frame and above said yoke and being adapted to be suspended from said vehicle.

13. In a push rake of the character described, the combination with a frame, of a plurality of tines longitudinal on the frame, journal pivot means on the frame for each tine, the pivot axis of said means being at an oblique angle with respect to the axis of the tine, and longitudinally spaced journal elements on the opposite sides of said tine engaged with said pivot means.

14. In a push rake of the character described the combination with a frame, of a plurality of tines, and a journal connection between each tine and the frame on a pivot axis oblique with respect to the tine.

15. In a push rake of the character described the combination with a frame, of a plurality of tines, and a journal connection between each tine and the frame on a pivot axis oblique with respect to the tine, the pivot axes of the tine journals on one side from the center line of the frame converging with the pivot axes of the tine journals on the other side from the center line of the frame.

16. In a push rake of the character described the combination with a frame, of a plurality of tines, a journal connection between each tine and the frame on a pivot axis oblique with respect to the tine, a penetrating point on each tine, and an abutment surface on the tine near said point at an angle to exert a reaction force around said pivot axis when engaged with the ground.

17. In a push rake of the character described the combination with a frame, of a plurality of tines, a journal connection between each tine and the frame on a pivot axis oblique with respect to the tine, a penetrating point on each tine, and an abutment surface on the tine near said point at an angle to exert a reaction force around said pivot axis when engaged with the ground, said point being in a plane substantially perpendicular with respect to the tine and projecting below the lower edge of said tine.

JACOBUS M. LANDRY.

REFERENCES CITED

The following references are of record in the file of this patent:

UNITED STATES PATENTS

| Number | Name | Date |
| --- | --- | --- |
| 1,219,018 | Madden | Mar. 13, 1917 |
| 1,378,793 | Johnson | May 17, 1921 |
| 1,420,106 | Irwin | June 20, 1922 |
| 1,640,031 | Elmore | Aug. 23, 1927 |
| 2,240,552 | Cope | May 6, 1941 |
| 2,241,878 | Firstenberger et al. | May 13, 1941 |
| 2,246,870 | Turner | June 24, 1941 |